INVENTOR:
JUAN BELART
BY Karl F. Ross
ATTORNEY

INVENTOR:
JUAN BELART
BY Karl F. Ross
ATTORNEY.

United States Patent Office 3,442,354
Patented May 6, 1969

3,442,354
CALIPER AND FRICTION PAD SUPPORT MEANS
Juan Belart, Walldorf, Hesse, Germany, assignor to Alfred Teves, Maschinen- und Armaturenfabrik KG Rebstockerstr, Frankfurt am Main, Germany, a corporation of Germany
Filed Feb. 23, 1967, Ser. No. 618,058
Claims priority, application Germany, Apr. 5, 1966, T 30,857
Int. Cl. F16d 55/00, 65/14
U.S. Cl. 188—73     8 Claims

ABSTRACT OF THE DISCLOSURE

A disk brake for wheels of an automotive vehicle or the like and manually and/or fluid operated which comprises a pair of brake shoes confronting the brake disk and interconnected by a pair of spreadable U-shaped springs affixed to the brake shoes along their backing plates carrying the brake linings. The resilient suspension means, constituted by these springs, fasten the brake-shoe assembly to a support bracket, fixed with respect to the disk and extending around the periphery thereof. The segmental brake shoes are guided in radially open cutouts of this support bracket and are provided with pins or bores slidably receiving complementary female or male formations of a yoke in which the brake shoes are guided and which is supported for movement transverse to the faces and parallel to the disk axis by the resilient means. The U-shaped springs are connected at their bights with inwardly extending tongues whose bent free ends bear frictionally against the underside of an overhang of the yoke while its flanks are frictionally engaged by bent knees of the tongues. The actuating means includes a hydraulic cylinder on the yoke provided with an adjusting device for automotive combination for brake wear to reposition the shoes upon operation of the brake and a lever-operated mechanical actuating system for displacing the brake shoes independently of the hydraulic actuation.

My present invention relates to manually and/or hydraulically operated disk brakes of the type in which a yoke extends around the periphery of the brake disk and acts upon a pair of movable brake shoes guided for displacement perpendicular to the respective braking surfaces of the disk.

The use of disk-type brakes (manually and/or fluid-operated) in automotive vehicles for at least one pair of wheel brakes has become common in recent years because of the greater braking effectiveness and simplicity of such brakes, their rapid actuation, and the comparative ease with which the brake linings and/or brake shoes can be changed and replaced.

Such brake systems include a brake disk rotatable about the axis of the wheel and generally mounted thereon for rotation with respect to a brake housing or support carried by the axle housing or another part of the vehicle chassis. The brake structure can include a yoke which extends around the periphery of the disk and, at least at one side thereof, is provided with actuating means such as a fluid motor (e.g. a piston-and-cylinder arrangement for hydraulic or pneumatic operation) or a manually operated lever system adapted to urge a respective brake shoe against the disk.

On the opposite side of the disk, the yoke transmits the reaction force of the actuating mechanism to a further brake shoe to draw the latter against the disk and clamp the disk between the two brake shoes thus moved toward one another. The brake shoes are, for tne most part, kidney or segmentally shaped backing plates whose surfaces facing the disk are bonded or otherwise affixed to flat and correspondingly shaped brake linings of high frictional coefficient, good wear and heat resistance, and inertness to lubricants such as oil and water which may penetrate the brake. The brake shoes, which usually are aligned with one another and engage corresponding areas of respective sides of the brake disk, may be guided toward and away from the latter and prevent twisting in the planes of the respective brake shoes by a further member fixed with respect to the disk and extending around the periphery thereof. The yoke is, in turn, movably mounted upon this member.

Brake systems of this general type of known construction have some significant disadvantages. When, for example, only such housing members serve as guides for the brake shoes, the shoes tend to cant with respect to the disk and to undergo nonuniform wear and develop a wedge-shaped configuration upon use. This nonuniform wear of the linings requires that they be replaced more often than is desirable and leads to the application of nonuniform braking forces to the disk. When guide pins perpendicular to the braking faces of the disk and parallel to the direction of displacement of the yoke are employed to guide the brake shoes and prevent such canting, the pins have a tendency to rust and become coated with contaminating substances which resist further sliding displacement of the shoes and even lead to jamming thereof. Such rusting and contamination also acts as a barrier to changing of the shoes or their replacement and special tools are often required to ease this task. In an alternative system, the guide pins for the brake shoes are eliminated by swingably mounting the yoke for at least limited twisting movement about an axis enabling the tilting movement of the yoke transverse to the axis of the brake system. This arrangement increases the uniformity of the forces applied to the brake surfaces but again leads to nonuniform wedgelike wear of the brake linings. In other systems, the shiftable yoke is guided with respect to the support member and generally is restricted in such movement by rubber O-rings or other systems serving as yieldable friction-developing movement-resisting members. In time, however, rollers and rings of this type plastically deform and are rendered ineffective or have frictional characteristics which are nonuniform or exert nonuniform pressures upon the yoke; the breakdown of such buffer elements occurs at a relatively high rate because of the large quantities of heat developed in the braking process and the high temperature sustained by the yoke under many operating conditions.

It is, therefore, the principal object of the present invention to provide an improved segmental disk brake which enables the brake shoes to be removed, replaced or examined with little difficulty and without special tools or expenditure of time.

Another object of this invention is to provide a disk brake which is free from disorders which have hitherto tended to develop in disk-type brakes because of jamming or seizing of the slidably interconnected parts upon the accumulation of contaminants upon the respective guide surfaces.

Yet a further object of this invention is to provide a disk-type brake having a pair of segmental brake shoes on opposite sides of the brake disk, which insures uniform wear of the brake linings and prevents wedgelike shaping thereof even after prolonged periods of use, and which is relatively inexpensive to manufacture and has a minimum number of parts capable of breakdown.

These objects and others which will become apparent hereinafter are attained in accordance with the present invention, by a disk brake having a rotatable braking disk with opposite brake faces generally transverse to the axis of rotation of the disk; a yoke extending around the periphery of the disk along a segment thereof; and a pair of segmental brake shoes whose linings confront the opposite faces of the disk and whose backing plates are pressed by the yoke toward the disk. The present invention provides further for resilient means for connecting the brake shoes with a brake-support member which is fixed with respect to the axis of the disk and the axis of the yoke and which may extend about the periphery of the disk and slidably support the yoke. Thus, guide means are provided on the yoke and the brake shoes for mating sliding interengagement permitting the shoes to shift with respect to the yoke perpendicularly to the braking faces of the disk, whereby the resilient suspension for the brake shoes simultaneously supports the yoke with freedom of movement with respect to the brake shoes and to the brake support within the range of mobility permitted by the resilient suspension means. The latter means may also include resilient straps of U-shape bridging the brake shoes for positioning them yieldably with respect to one another, the shanks of each U being spreadable or deflectable, in the manner of a leaf spring, so that these bridge pieces constitute spreadable springs for retaining the brake shoes. The bight of the U-shaped bridge pieces may, according to a specific feature of this invention, be retained on the brake support by screws, rivets or clamping means connecting these bridge pieces to leaf-spring tongues of the brake support.

According to a particularly advantageous aspect of this invention, the spreadable bridge springs have three arms extending angularly from one another whereby the brake shoes are retained by a pair of these arms and the other two-arm bears rigidly upon the yoke. Alternatively, the two-arm bridge piece described above can have a spring finger or leaf spring, one end of which is fastened to the brake support while the other bears yieldably against the yoke and forms a guide therefor, resisting movement of the yoke by friction forces.

When spring fingers of the bridge pieces bear resiliently against the yoke, the latter may be provided with recesses (e.g. grooves or undercuts) to receive the fingers. Similarly, the guide elements are slidably received in recesses, bores or grooves of the yoke and, in accordance with a further feature of this invention, may be rigid with the brake support and/or blocking plate of the brake shoe. A kinematic reversal of the system is also contemplated in accordance with this invention, whereby the male guide elements may be rigid with the yoke while recesses, bores and grooves are provided in the brake shoes to receive these guide elements. In another modification, at least two guide elements are rigid with the brake support or slidable in a guide plate which bears in turn upon the wheel-cylinder piston of the brake arrangement. To this end, the yoke may carry a swingable lever for the actuation of the brake by hand, a self-adjusting ratchet mechanism being provided between this lever and the brake piston to compensate for brake wear. It is also possible, according to my invention, to provide a manually operable speading device between a brake shoe and the brake piston, for driving the brake shoes against the disk upon rotation of an actuating lever having inclined ramp camming surfaces co-operating with the balls for drawing the brake shoes together.

The above and other objects, features and advantages of this invention will become more readily apparent from the following description, reference being made to the accompanying drawing in which.

Figure 1:
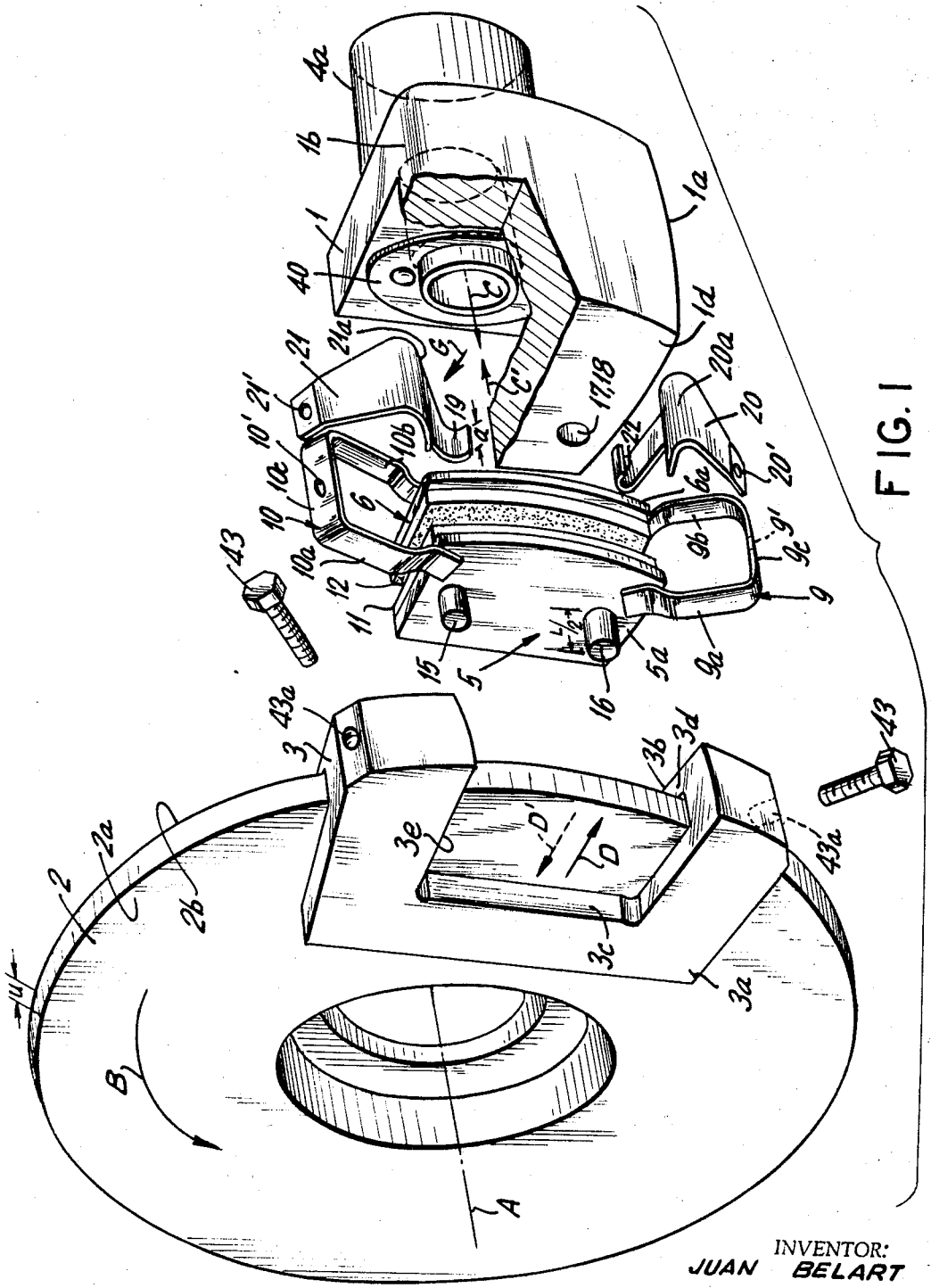
FIG. 1 is a perspective exploded view, partly broken away and partly in diagrammatic form, of a disk-type brake in accordance with the present invention.
Figure 2:
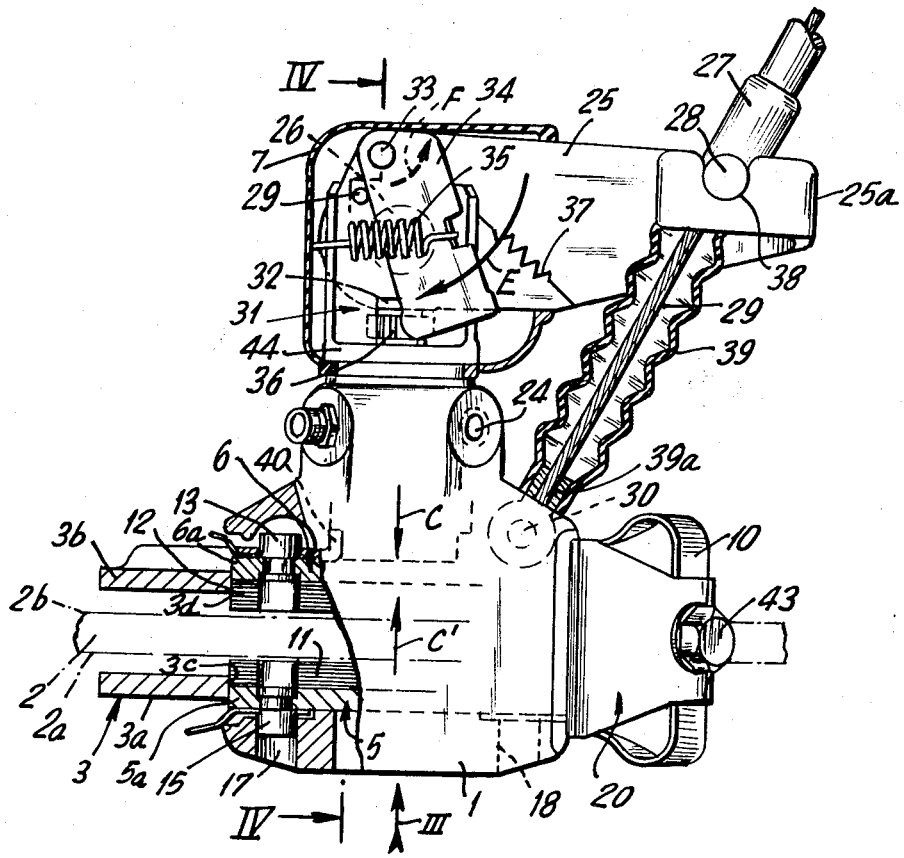
FIG. 2 is a plan view, partly in section, of the disk brake of FIG. 1 provided, in addition, with manual actuating means for supplementing the hydraulic actuating mechanism.
Figure 3:
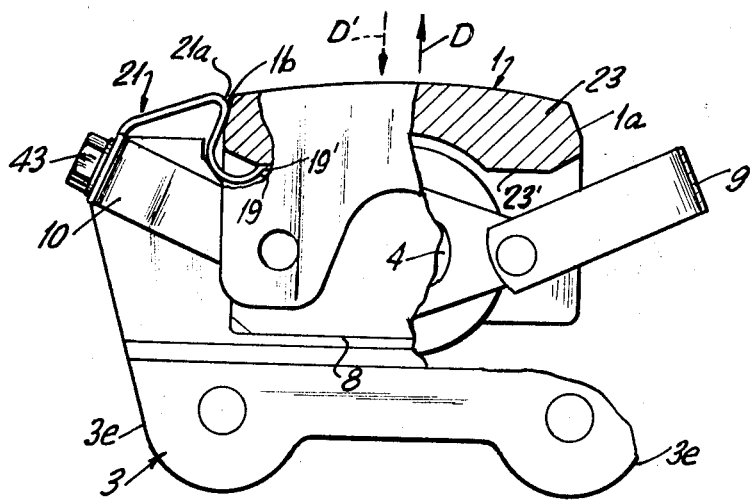
FIG. 3 is a side-elevational view, partly broken away, of the brake of FIG. 2, taken in the direction of the arrow III of FIG. 2.

Referring first to FIGS. 1–3 which illustrate an embodiment of the disk brake of the present invention and show the principal parts thereof, it can be seen that my improved brake comprises a brake disk 2 which is rotatable about an axis A with respect to a fixed portion of the vehicle. Thus, for example, the brake disc 2 may be the wheel brake of an automotive vehicle, whereupon the disk will be rotatably entrained with the wheel while the brake-support structure will be constituted by the axle housing or corresponding structure. The brake disk 2 is provided with a pair of braking faces 2a and 2b, generally transverse to the axis A and respectively engageable by a pair of segmental brake shoes 5 and 6 of rectangular outline.

A brake-support member 3, affixed to the axle housing or other stationary vehicle part by means not illustrated in FIG. 1, but represented by lobes 3e in FIG. 3, is constituted as a yoke whose opposite sides 3a and 3b extend about the periphery of the disk parallel to its braking faces 2a and 2b. Each side of the brake-support member 3 is provided with a respective rectangular cutout 3c or 3d, respectively adapted to receive the brake shoes 5 and 6 so as to prevent shifting of the brake shoes in the direction of movement of the disk 2 (arrow B) or canting of the brake shoes (see FIG. 2). The brake shoes 5 and 6, in turn, are formed with backing plates 5a and 6a, by means of which pressure may be applied from the brake yoke 1 in the axial directions C and C' to urge juxtaposed and mutually aligned brake shoes toward one another and into frictional engagement with the disk 2.

The brake shoes 5 and 6 are also formed with replaceable brake linings 11 and 12 having a high coefficient of friction, good wear resistance and inertness to contaminants scuh as oil or water which may penetrate the brake system.

According to a feature of this invention, the brake-operating means includes a yoke 1 which, as is described in greater detail hereinafter, is resiliently supported upon the brake-support member 3 and is provided with a fluid-operated wheel cylinder 4. The latter is axially shiftable in the cylinder 4a cast into the yoke 1 and receiving hydraulic fluid via a fitting or port 24 (FIG. 2). In addition, manual actuating means is provided at the end of the cylinder 1 remote from the disk 2 as best illustrated in FIG. 2, this manual actuating means being encased in a dust cap 7 of sheet metal or an elastomeric material. Thus, when the system of FIGS. 1–3 is employed as the wheel brake of an automotive vehicle, the mechanical actuating means can serve as the "hand brake" or "emergency brake" and may be operable via a cable or the like by hand or foot from the driver's seat of the vehicle.

As can be seen from FIG. 1, the cutouts 3c and 3d of the brake-support member 3 accommodate the brake shoes 5 and 6 while forming guides permitting their movement in a direction perpendicular to the braking faces 2a and 2b of the disk, i.e. parallel to the axis A. Furthermore, these cutouts 3c and 3d are radially open outwardly (arrows D in FIG. 1 and 3) to permit the brake shoes 5 and 6 to be withdrawn in this radial direction for replacement. The brake shoes may be inserted radially in the opposite direction (arrow D').

According to an important feature of this invention, the brake shoes 5 and 6 are connected with one another by a pair of U-shaped spreading leaf springs 9 and 10 whose shanks 9a and 10a can be resistance-welded to the backing plate 5a of brake shoe 5 whereas the shanks 9b and 10b are resistance-welded to the backing plate 6a. The backing plates 5a and 6a are also provided, remote from the respective brake linings 11 and 12, with a pair of guide pins 13, 14 and 15, 16, respectively. The guide pins 15 and 16 are snugly but slidably received in a pair of guide bores 17, 18 provided for this purpose in the arm 1d of the yoke 1. The guide pins 13 and 14, in turn, pass through a guide plate 40 and bear directly against the wheel-cylinder piston 4. The spreadable U-shaped springs 9 and 10 are fastened to respective leaf springs 20 and 21 whose S-shaped ends 22 engage beneath an overhang 23 on the respective sides of the web 1a of the yoke 1; screws 43 join the leaf springs 20 and 21 to the respective U-springs 9 and 10 and to the brake-support member 3 into which the bolts 43 are threaded at 43a.

It will thus be apparent that, with the bight portion 9c, 10c of each U-spring 9, 10 affixed to the brake-support member 3, the shanks 9a, 9b and 10a, 10b overly the respective arms 3a and 3b of the brake support and resiliently suspend the brake shoes 5 and 6 with freedom of axial movement (arrows C and C') while preventing any lateral shifting of the brake shoes. Furthermore, the suspension 9, 10, 20, 21 also resiliently supports and guides the yoke 1 upon the member 3, any radially outward movement of the yoke 1 being prevented by the guide pins 13–16.

When the wheel cylinder piston 4 is shifted to the left (FIG. 1) or in the direction of arrow C in FIG. 2, upon the delivery of hydraulic pressure from the vehicle master cylinder to the inlet port 24 of wheel cylinder 4a, the piston 4 bears upon the brake shoe 6 and urges it against the braking face 2b of the disk 2 in the direction of arrow C; the reaction force is applied in the direction of arrow C' by the other arm 1d of the yoke 1 which draws the brake shoe 5 against the braking face 2a of the disk 2 as the yoke 1 moves in the direction of arrow C'. The torque about axle A applied to the brake shoes 5 and 6 as they frictionally engage the disk 2 is taken up by the edges 3e of the support member 3 when the disk 1 rotates in the direction of arrow B.

Figure 4:
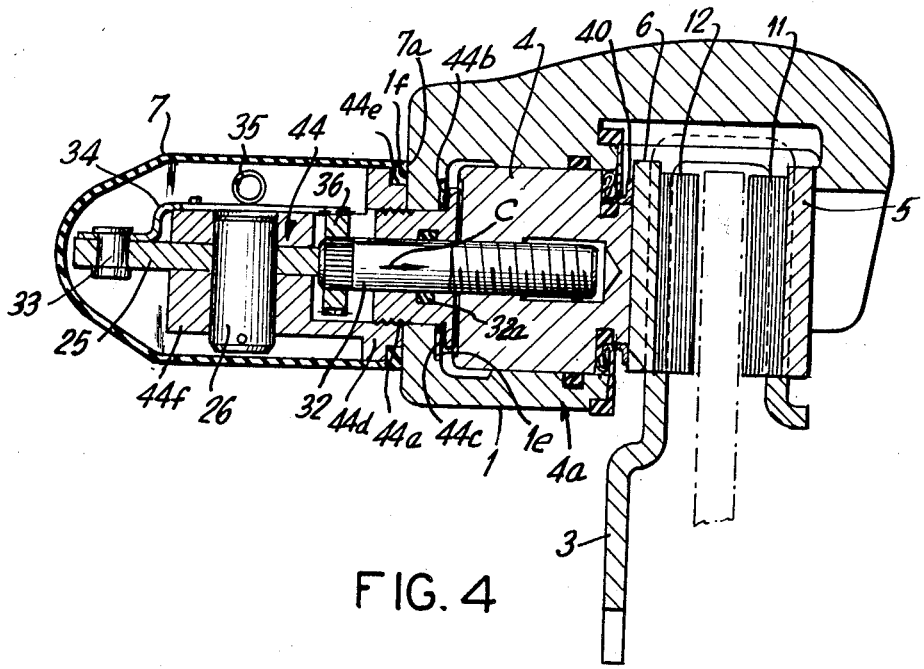
FIG. 4 is a longitudinal cross-sectional view taken along the line IV—IV of FIG. 2.

Manual operation of the brake can be effected to lock the latter for parking or emergency purposes via a further actuating means enclosed within the dust cap 7 as mentioned earlier. As illustrated in FIGS. 2 and 4, the manual actuating means includes a support 44 threadedly secured to the yoke 1 via a hollow bolt 44a whose head 44b engages the inner wall 1e of the yoke 1 via a sealing washer 44c, the threaded hub 44d, which engages the shank of the tubular bolt 44a, is locked against this outer wall 1f of the yoke 1 and is formed with a shoulder 44e behind which is received a bead 7a of the dust cap 7.

An actuating lever 25 is received within the bifurcated end 44f of the support block 44 and is fulcrumed thereon via a pin 26. The latter is held in place by cutter pins or the like in a conventional manner. The free end of the lever 25 is, as can be seen in FIG. 2, formed with a hook 25a which constitutes a trunnion for the sheath 27 of a Bowden cable running to the driver's seat of the vehicle and actuatable by a hand or foot lever in the usual manner. The sheath is provided with a transverse pin 28 which rests in the notches 38 (one shown) of the hooked end 25a of actuating lever 25. The core 29 of the Bowden cable is swivelably connected at 30 to the yoke 1 whereby relatively axial movement of the sheath 27 and the core 29 of the Bowden cable tends to swing the lever 25 in the clockwise sense about the pivot 26 as represented by arrow E. The projecting portion of cable 29 is surrounded by a flexible bellows-type protective sleeve 39 resiliently hugging the lower end of the core 29 via a bead 39a to prevent coating of the cable with contaminants.

When the lever 25 is swung in the direction of arrow A, the forward arm 31 of the lever bears upon the self-adjusting bolt 32 (FIG. 4) which is threaded into the piston 4 and is axially slidable in the tubular bolt 44a. Thus the piston is shifted in the direction of arrow C (FIGS. 1 and 4) independently of the hydraulic actuation and the reaction force draws the brake shoe 5 against the disk to lock the brake in place until the Bowden cable is released. A seal 32a surrounds the axially shiftable bolt 32 to prevent leakage of hydraulic fluid from the cylinder 4a.

To compensate for wear of the brake linings, the bolt 32 is force-fitted into a pinion gear 36 which co-operates with the self-adjusting lever 34. The latter is pivoted at 33 to the lever 25 and is urged in a clockwise sense by a tension spring 35 (see FIGS. 2 and 4). A fixed abutment 29 upon the suppport 44 limits the clockwise stroke of the self-adjusting lever 34. Thus, with each operation of the lever 25, the lever 34 is temporarily retained between abutment 39 and swings about its pivot 33 in the counterclockwise sense (arrow F) relative to the lever 25. Upon release of this lever, a spring 37 (or some other conventional restoring means at the other end of the Bowden line) draws lever 25 in the counterclockwise sense about its fulcrum 26 and permits the lever 34 to swing in the direction of arrow E and thereby stop the pinion gear 36. The latter rotates the bolt 32 relative to the piston 4 and draws the bolt further out of the piston, thereby effectively bringing the brake shoes closer together by an amount equivalent to the brake wear.

When it is desired to remove the brake shoes 5 and 6 for their replacement or to replenish the linings 11 and 12 thereon, the bolts 43 can be removed and the assembly of the yoke 1, the brake shoes 5, 6 and the spring suspension 9, 10, 20, 21 shifted radially from the openings 3c and 3d in the direction of the arrow D. The brake shoes may then be pressed toward one another to withdraw the pins 13, 14, 15 and 16 from the respective guide bores 17 and 18 of the yoke. Thereafter, the brake shoe and spring assembly can be slipped out from between the arms of the yoke in the direction of arrow G for replacement of the brake linings. To this end, the pins 13, 14 and 15, 16 should have a total axial length L no greater than the width u of the disk 2 so that, when the brake shoes 5 and 6 are pressed together, at least one set of the pins 13–16 and preferably both are fully withdrawn from the bore 17, 18. Upon replacement of the brake linings, the brake shoes are again pressed together, inserted between the arms of the yoke 1 and, under the force of the spreading springs 9 and 10, permitted to seat against the arms of the yoke with the pins 13–16 entering the respective bores 17, 18. The yoke and brake-shoe assembly may then be inserted into the brake support member 3 in the direction of arrow D'. Then bolts 43 are threadedly inserted through the aligned bores 20', 9' and 21', 10' to affix the spring assembly to the brake suport member 3. The resilient ends 19 and 20 of S-configuration and edges such as that shown at 19' in FIG. 3 resiliently engaging the underside 23' of the overhangs 23 while a flank (e.g. 21a) of each free end of the springs 20, 21 frictionally engage the flanks 1a and 1b of these overhangs. Thus, the movement of the yoke 1 in the direction of arrow C' is resisted by the friction force of these spring ends and the yoke is retained in place thereby until the friction force is overcome by the hydraulic or manual actuating forces applying the brake shoes 5 and 6 against the disk. The flanks 20a and 21a thus form a guide for the yoke 1 in its movement parallel to the axis A (see FIG. 1).

Figure 6:
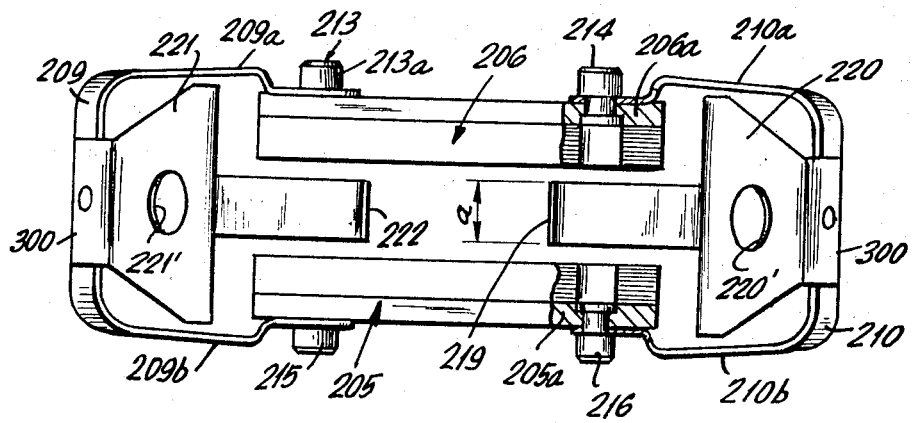
FIG. 6 is a top view, partly broken away, of this brake-shoe assembly slightly modified.
Figure 7:
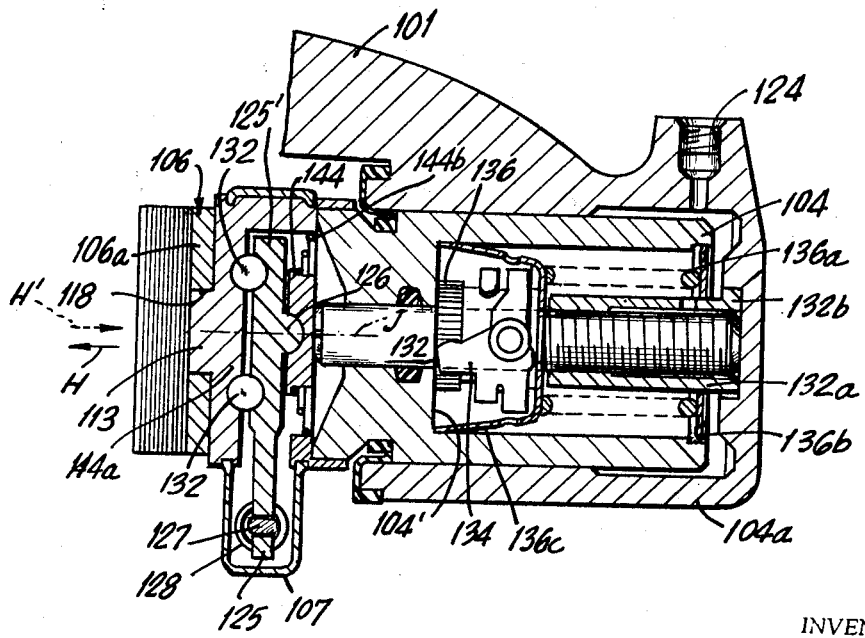
FIG. 7 is a fragmentary longitudinal cross-sectional view of another actuating device for a brake according to this invention.

In FIG. 7, I show a modified manually actuated operating mechanism for a brake of the type generally described in connection with FIGS. 1–4. In this embodiment, the same brake-support member 3 and brake-shoe arrangement is employed except that the brake shoe 106 proximal to the cylinder 104a of the yoke 101 receives a central projection 113 in a bore 118 of the backing plate 106a. The brake shoe 106 is resiliently connected via a separable spring arrangement of the type illustrated in FIGS. 1 and 3 which may slidably engage the yoke 101, or with the resilient suspension illustrated in FIGS. 5 and 6 and described in greater detail hereinafter. In this embodiment, however, when the brake shoes 106 etc. are drawn together against the spring force, the male formation 113 is withdrawn from the guide bore 118 of the backing plate 106a. Otherwise, insertion and removal of the brake shoes is effected in the manner previously described. The hydraulic actuating means of this system comprises a piston 104 which is received slidably in the cylinder 104a and is biased to the left (arrow H) when hydraulic fluid is introduced via a port 124. The manual actuating means of this embodiment includes a lever 125 having a disk-shaped portion 125' with a ball-shaped boss 126 pivotally mounting the lever 125 in a bearing plate 144. This plate abuts a threaded spindle 132 extending axially through the piston 104 and threadedly engaging a sleeve 132a retained against rotation at its polygonal head 132b seated in the righthand extremity of the cylinder 104a. Between the disk portion of the lever 125 and a further plate 144a (axially shiftable with respect to plate 144 and formed with the mail guide member 113), there are provided a multiplicity of camming balls surrounding the axis J of rotation of the lever 125. The bolts 132 ride in ramp-like recesses of the disk portion 125' and the plate 144a, as illustrated and described in the commonly assigned copending application Ser. No. 585,877, filed Oct. 11, 1966, so that, upon angular movement of the lever 125 via a Bowden cable 127, 129, a reaction force in the direction of arrow H' will be applied to shift the yoke 101 to the right (FIG. 7) while the brake shoe 106 is urged to the left against the brake disk. The manual actuating means is here enclosed within a dust-excluding housing 107. To position the bearing plate 144 with respect to the fulcrum boss 126 and the piston 104, I provide a spiral spring 144b for centering this member with respect to the other bearing member 144a.

The self-adjusting means of this system is of the conventional type and includes a ratchet wheel 136 mounted upon the threaded pin 132 which, in turn, is screwed into the sleeve 132a. A spring 136a is seated against a plate 136b fastened within the piston 104 and forming with a cap 136c a captive-spring system. Thus, when the piston 104 advances (arrow H) while the sleeve 132b is held stationary in the yoke 101, the ratchet 136 is rotated by the advance, in this direction of arrow H by the spring 136a upon engagement by the cap 136c with the pawl assembly 134. The ratchet thus turns the bolt 132 out of the sleeve 132a and compensates for wear of the brake shoes. Upon release of the hydraulic pressure, wall 104' lifts the cap 136c away from the pawl assembly 134.

Figure 5:
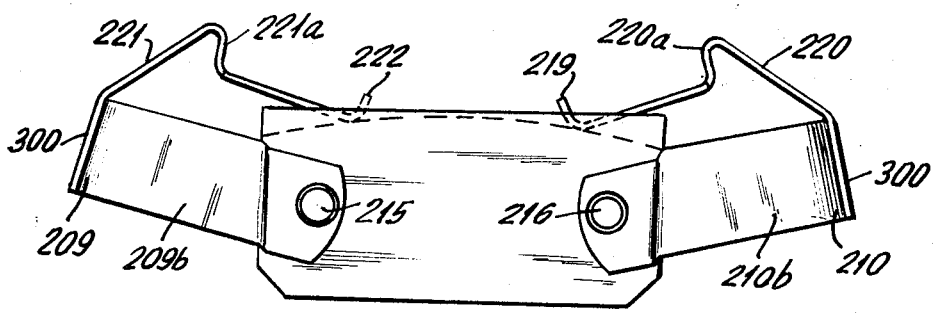
FIG. 5 is a plan view of a pair of resiliently connected brake shoes suitable for use in the brake of FIGS. 2–4.

In FIGS. 5 and 6, I show another spring suspension for the brake shoes. In this system, the brake shoes 205, 206 have backing plates 205a and 206a to which the ends of shanks 209a, 209b, and 210a, 210b are attached by rivets 213, 214, 215 and 216 whose heads 213a etc. form axially extending guide formations similar to the pins 13-16 described in FIGS. 1-4. The U-shaped springs 209 and 210 are here integrally formed with leaf springs 220 and 221 whose upwardly bent edge portions 219 and 222 engage the underside of the overhanging web of the yoke as illustrated at 23 in FIG. 3. In addition, the bent tongues 219 and 222 are stamped from sheet metal with a flat trapezoidal portion in which bores 221' and 220' permit bolts (e.g. bolts 43) to join the spring assemblies to the brake-support member 3. Inwardly bent flanks 221a and 220a may bear upon the flanks 1a and 1b of the yoke as previously described. In the modification of FIG. 6, the plates 220 and 221 are shown to have flanges 300 which are riveted or spotwelded to the bight portions of U-shaped springs 209 and 210, respectively. The brake-arrangement system operates in the manner previously described.

I claim:
1. In a disc-brake system, the combination of a brake disk rotatable relatively to a structure about an axis fixed with respect to the said structure and having a pair of annnular brake faces, with:
  (a) a brake support fixed to said structure and extending about the periphery of said disk;
  (b) a pair of brakeshoe members respectively juxtaposed with said brake faces of said disk and independently shiftable toward and away from said faces relative to said brake support;
  (c) a yoke member movable relatively to said support in the direction of movement of said brakeshoe members and adapted to bear thereon for urging said brakeshoe members against said disk, said yoke member and said brakeshoe members being provided with mating slidably interengageable guide formations limiting relative movement of said members in said direction to movement;
  (d) actuating means on said yoke member for urging said brakeshoe members toward said disk; and
  (e) resilient suspension means yieldably connecting said brakeshoe members with said brake support, said brake support having a pair of arms overlying the respective faces of said disk and formed with radially outwardly open cutouts dimensioned to receive said brakeshoe members, said brakeshoe members each comprising a backing plate remote from the respective brake face and a brake lining mounted on the respective backing plate and confronting said disk, said resilient suspension means including a pair of unitary U-shaped resiliently spreadable single-leaf flat springs extending around the periphery of said disk and bridging said brakeshoe members and secured to said brake support, each of said U-shaped springs having a pair of shanks respectively fixed to the backing plate of each of said brakeshoe members for biasing same away from said disk and a bight interconnecting said shanks and secured to said brake support.

2. The combination defined in claim 1 wherein each of said U-shaped springs is formed at the respective bight with a leaf-spring tongue extending generally inwardly and frictionally engaging said yoke member for yieldably resisting displacement thereof in said direction, said resilient suspension means constituting essentially the sole means supportng said yoke member and said brakeshoe members upon said brake support.

3. In a disk-brake system, the combination of a brake disk rotatable relatively to a structure about an axis fixed with respect to the said structure and having a pair of annnular brake faces, with:
  (a) a brake support fixed to said structure and extending about the periphery of said disk;
  (b) a pair of brakeshoe members respectively juxtaposed with said brake faces of said disk and independently shiftable toward and away from said faces relative to said brake support;
  (c) a yoke member movable relatively to said support in the direction of movement of said brakeshoe members and adapted to bear thereon for urging said brakeshoe members against said disk, said yoke member and said brakeshoe members being provided with mating slidably interengageable guide formations limiting relative movement of said members in said direction to movement;
  (d) actuating means on said yoke member for urging said brakeshoe members toward said disk; and
  (e) resilient suspension means yieldably connecting said brakeshoe members with said brake support, said brake support having a pair of arms overling the respective faces of said disk and formed with radially outwardly open cutouts dimensioned to receive said brakeshoe members, said brakeshoe members each comprising a backing plate remote from the respective brake face and a brake lining mounted on the respective backing plate and confronting said disk, said resilient suspension means including a pair of U-shaped resiliently spreadable springs bridging said brakeshoe members and secured to said brake support, each of said U-shaped springs having a pair of shanks respectively fixed to the backing plate of each of said brakeshoe members and a bight interconnecting said shanks and secured to said brake support, each of said U-shaped springs being formed at the respective bight with a leaf-spring tongue extending generally inwardly and frictionally engaging said yoke member for yieldably resisting displacement thereof in said direction, said resilient suspension means constituting essentially the sole means supporting said yoke member and said brakeshoe members upon said brake support, said yoke member having a pair of overhangs extending in said direction and disposed on opposite lateral sides of said yoke member, said inwardly extending leaf-spring tongues being each formed with bent free ends bearing edgewise upon the overhangs from below and with respective resilient flanks bearing inwardly upon the sides of said yoke member, said springs being connected at the junction between the respective bights and the respective tongues with said brake support.

4. The combination defined in claim 3 wherein said mating guide formations include a plurality of outwardly extending pins fixed to each of said backing plates, said yoke member being formed with bores slidably receiving said pins, said pins being dimensioned for withdrawal from said bores upon movement of said brakeshoe members together against the spreading force of said springs, thereby permitting release of said brakeshoe members from said yoke member.

5. The combination defined in claim 3 wherein said guide formations include at least one projection carried by said yoke member and slidably received in a complementary recess formed in a corresponding backing plate of at least one of said brakeshoe members and dimensioned for withdrawal from said bores upon movement of said brakeshoe members together against the spreading force of said springs, thereby permitting release of said brakeshoe members from said yoke member.

6. The combination defined in claim 3 wherein said guide formations include a male formation carried by one of said brakeshoe members, and a plate having a recess slidingly receiving said male formation and bearing upon said yoke member.

7. The combination defined in claim 3 wherein said actuating means includes a fluid-operated cylinder carried by said yoke and a piston slidably displaceable in said cylinder for acting upon one of said brake-shoe members, further comprising self-adjusting means operable upon displacement of said one of said brakeshoe members for establishing a rest position therefor compensating for wear of said brakeshoe members.

8. The combination defined in claim 3 wherein said actuating means includes a fluid operated cylinder carried by said yoke member and a piston slidably displaceable in said cylinder for acting upon one of said brakeshoe members, further comprising manually operable means carried by said yoke for advancing said brake-shoe members against said disk independently of fluid actuation of said cylinder.

References Cited
UNITED STATES PATENTS

| | | | |
|---|---|---|---|
| 2,994,410 | 8/1961 | Burnett | 188—73 |
| 3,265,160 | 8/1966 | Elberg et al. | 188—73 |
| 3,292,740 | 12/1966 | Swift | 188—73 |
| 3,294,205 | 12/1966 | Schanz | 188—216 |
| 3,326,329 | 6/1967 | Harrison. | |

GEORGE E. A. HALVOSA, *Primary Examiner.*

U.S. Cl. X.R.

188—205, 216